July 9, 1968     G. A. DU ROCHER     3,391,432
CLASP FOR ELECTRICAL CONDUCTORS
Filed Jan. 16, 1967
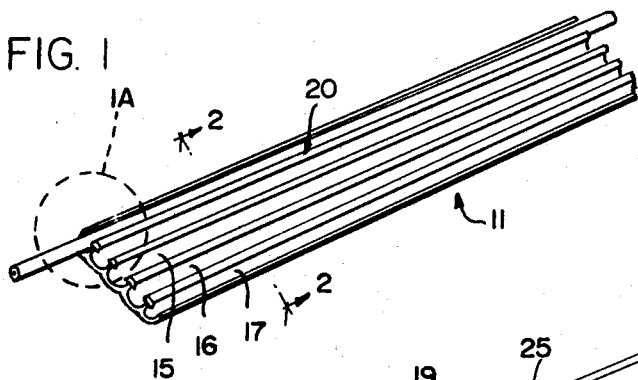
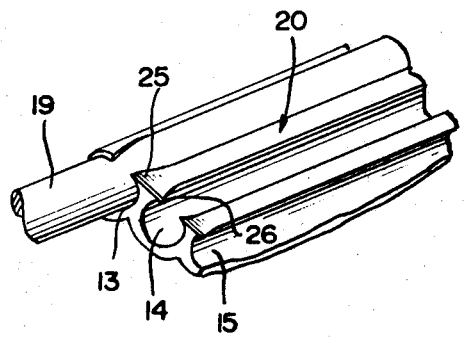
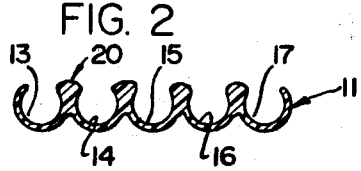
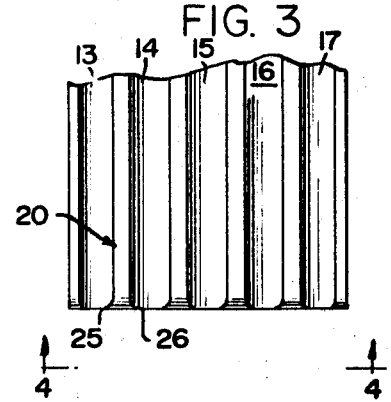
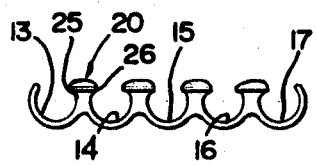
INVENTOR
GIDEON A. DuROCHER
BY *Dair, Freeman & Molinare*
ATTORNEYS United States Patent Office 3,391,432
Patented July 9, 1968

3,391,432
CLASP FOR ELECTRICAL CONDUCTORS
Gideon A. DuRocher, Mount Clemens, Mich., assignor to Essex Wire Corporation, Fort Wayne, Ind., a corporation of Michigan
Filed Jan. 16, 1967, Ser. No. 609,392
4 Claims. (Cl. 24—81)

ABSTRACT OF THE DISCLOSURE

A clasp for receiving and fastening wires and the like by means of grooves having integrally fabricated holding means positioned at the ends of the grooves, the holding means being nipple-like extensions from the walls of the grooves which overlay and hold down wires running through the grooves.

Background of the invention

This invention relates to an improved clasp for holding electrical wires and the like in a flat, fixed position and, more particularly, to a clasp having grooves for receiving wires with means at the groove ends for locking the wires in place.

In a variety of applications, it is often desirable to position and secure a plurality of electrical conductors in a coplanar, parallel array. Rather than holding the wires together in a bundle by means of a wiring harness, a clasp may be employed to mount the wires flat and in a fixed parallel position. Such a clasp makes individual wires more accessible for repair and replacement. Moreover, where the wires are to be secured along a supporting surface or under a rug, the use of a clasp for holding the wires flat produces a neat, unobtrusive installation and reduces the likelihood of snagging or tripping over the wires.

In an attempt to provide a means for positioning a wire or multiple wires in a flat, fixed position, wire channel assemblies or clasps have been used in the past. Such clasps are preferably fashioned of resilient plastic material and include grooves for receiving the wires. Each wire is secured in its groove by some fastening means, preferably the means being longitudinal ridges along the top of the grooves which extend over the grooves and constrict the mouth of the groove channel. Each wire is pressed into its groove, the wire being forced through the constriction at the top of the groove and into the pocket of the groove where it is thereafter securely retained. The ridges thus tend to hold the wire in a fixed position. A wire clasp arrangement of this type is described in British patent specification 659,728 published Oct. 24, 1951.

Fastening a wire in a groove by this method alone is not entirely satisfactory. The wire has a tendency to disengage from the clasp at the ends of the groove, particularly if the wire diameter is only slightly greater than the width of the mouth of the groove. Once disengaged at a groove end, the wire may then more easily work its way out of the groove along its entire length. In order to prevent the wire from being pulled from its groove, the above-noted British patent suggests placing a wedge in a slot which is adjacent to and parallel with the groove. Insertion of the wedge into the slot distorts the resilient material and tends to close the mouth of the adjacent groove, thus holding the wire more securely in position. However, abrasions of such a wedge-locked clasp assembly may cause the wedges to disengage, freeing the wires. More importantly, however, considerable fabrication time is required to fully secure wires in a wedge-locked clasp of this type.

Summary of the invention

In a principal aspect the present invention takes the form of an improvement in a semi-rigid, a resilient wire clasp including one or more parallel wire receiving grooves. According to the invention, nipple-like integral extensions are formed at the groove ends, the extensions protruding from the side walls of the groove to overlay the wires, holding them within the groove. Such protrusions may be simply and effectively formed by cutting the extruded resilient material with a heated, relatively blunt cutting instrument.

It is a principal object of the invention to provide an improved locking means in a grooved wire clasp, thereby more securely retaining the wires in their respective grooves.

Another object of the invention is to provide an improved wire clasp capable of securely retaining wires having different diameters and cross-sectional shapes.

It is a further object of the invention to provide an improved wire clasp which is easily fabricated into required lengths and which includes locking means integrally molded at the groove ends of each of these lengths.

These and other objects, features and advantages of the present invention may be better understood by considering the detailed description which follows.

Brief description of the drawing

FIGURE 1 illustrates in a perspective view a wire clasp embodying the invention with one wire inserted therein;

FIGURE 1A is an enlarged perspective view of a portion of the clasp shown in FIGURE 1;

FIGURE 2 is a cross-sectional view of the clasp taken along the line 2—2 of FIGURE 1;

FIGURE 3 is a top, plan view of an end portion of the clasp shown in FIGURE 1; and FIGURE 4 is an end, elevational view of the clasp contemplated by the invention.

Description of the preferred embodiment

FIGURE 1 shows a clasp, indicated generally at 11, which is adapted to retain up to five wires in a parallel, coplanar array. The main body of the clasp 11 is preferably extruded from a semi-rigid, resilient material to form a series of parallel, longitudinal grooves 13 through 17, each of substantially circular cross-section. In FIGURE 1, a wire 19 is shown in place within groove 13.

The wire locking means contemplated by the present invention may be more clearly seen in the enlarged view of FIGURE 1A. The grooves 13 and 14 are divided by a partitioning wall indicated generally at 20 which is enlarged at its top to constrict the mouth of the groove. Thus, along the length of the groove 13, the mouth of groove 13 is narrower than the width of the wire 19 and thus tends to hold the wire 19 in position. In accordance with the invention, the partition 20 at its end is shaped to provide outwardly extending, nipple-like projections 25 and 26 which further constrict the mouth of the grooves 13 and 14 at their ends.

When the clasp is formed from a thermoplastic material, the nipple-like projections at the end of the partition 20 may be formed by means of a heated, blunt cutting instrument (not shown) which is also used to cut the clasp 11 to the appropriate length. Thus, the cutting operation and the formation of the wire locking means at the end of the clasp may be formed in a single step. The heated cutting instrument causes the plastic material to become soft adjacent the cutting blade to create the extensions 25 and 26 defined at the end of partition 20. Such a heated cutting blade does, of course, form similar protrusions at the ends of the other partitions as well.

As can be clearly seen from FIGURE 3, the wire-locking projections 25 and 26 extend in a lateral direction perpendicular to the length of the groove and beyond the normal extension of the enlarged upper portion of the partition 20. The manner in which the enlargement of the partition separating the grooves is made more pronounced at the ends of the partitions is also clearly illustrated by a comparison between FIGURES 2 and 4 of the drawings. By constricting the mouth of each groove at its end by a greater degree than the constriction along the length of the groove, it is possible to easily insert the wires into the grooves along their lengths without detracting from the tenacity with which the wires are retained within the grooves. The clasp, according to the present invention, is simple to fabricate, highly durable, and less complicated and cumbersome than earlier clasp arrangements. Furthermore, the clasp according to the invention is capable of securely retaining the various wire sizes in a locked position even though the dimensions of the grooves themselves are of equal size.

It is to be understood that the specific embodiment of the invention which has been described is merely illustrative of one application of the principles of the invention. Numerous modifications may be made by those skilled in the art without departing from the true spirit and scope of the invention.

What is claimed is:

1. In a semi-rigid clasp for resiliently retaining a wire or the like in a flat position, said clasp being of the type having a longitudinally extending groove defined therein by opposed walls for removably receiving and holding said wire, the improvement comprising a wire-locking means positioned at each end of said groove, said locking means comprising a first nipple-like extension of generally triangular configuration of the type obtained by slicing a wall of extruded resilient material by means of a relatively blunt cutting instrument, said extension protruding from a wall of said groove and extending over said groove such that a wire may be snappingly inserted in said groove to pass under said extention and be frictionally held thereby in a substantially immovable position.

2. The improvement as set forth in claim 1 including a second nipple-like extension positioned on a groove wall substantially opposite said first nipple-like extension such that a wire fully inserted in said groove will pass under both said first and second extensions.

3. The improvement as set forth in claim 1 wherein said clasp includes a multiplicity of substantially identical, parallel grooves.

4. The improvement as set forth in claim 1 wherein said clasp is extruded from a semi-rigid, resilient thermoplastic material.

References Cited

UNITED STATES PATENTS

| | | | |
|---|---|---|---|
| 2,228,493 | 1/1941 | Will | 120—23 |
| 2,643,840 | 6/1953 | Lanman | 24—67.1 |
| 2,606,041 | 8/1952 | Misiak | 211—69 XR |
| 2,720,969 | 10/1955 | Kendall | 206—72 |
| 2,844,244 | 7/1958 | Hanson | 206—17 |
| 3,251,069 | 5/1966 | Clark | 24—81 XR |

FOREIGN PATENTS 1,188,154      1959    France.

DONALD A. GRIFFIN, *Primary Examiner.*